Dec. 19, 1933.  A. W. THOMPSON  1,939,867
RECEPTACLE
Filed Feb. 4, 1930
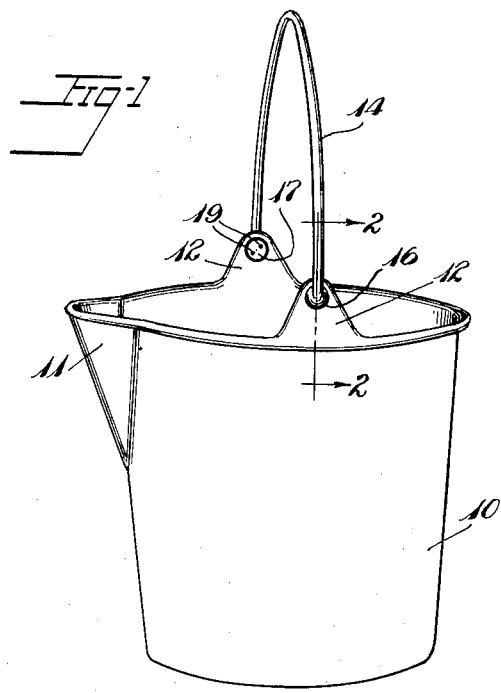
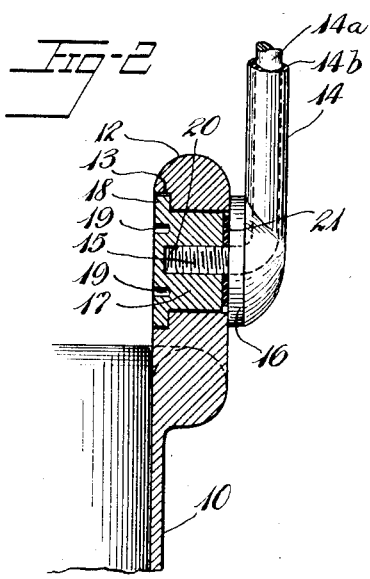
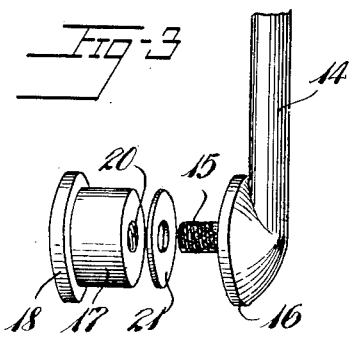
Inventor
Anan W. Thompson
By Eakin & Avery
Attys.

Patented Dec. 19, 1933

1,939,867

UNITED STATES PATENT OFFICE 1,939,867

RECEPTACLE

Anan W. Thompson, Akron, Ohio, assignor to The B. F. Goodrich Company, New York, N. Y., a corporation of New York Application February 4, 1930. Serial No. 425,775

9 Claims. (Cl. 220—91)

This invention relates to receptacles such as are provided with bails, and more especially it relates to receptacles composed of corrosion-resisting material at least in surface regions and provided with bails which are protected by similar material. The invention primarily is directed to means for pivotally attaching the ends of an insulated bail to a receptacle comprising corrosive-resisting material such as rubber or the like, and the chief objects of the invention are to provide an assembly of the character mentioned which will permit nesting of the receptacles; to provide relatively large bearing surface between relatively moving parts; and fully to protect the metal part of the assembly from contact with fluid.

Of the accompanying drawing:

Fig. 1 is a perspective view of my improved receptacle in its preferred form.

Fig. 2 is a section on line 2—2 of Fig. 1.

Fig. 3 is a detail perspective view of one of the end portions of a bail, and associate means for attaching the latter to a receptacle.

Referring to the drawing, 10 is a receptacle such as a pail or bucket constructed of corrosion-resisting material such as rubber, which preferably is semi-hard or relatively stiff to provide rigidity and resistance to fracture. The receptacle may be provided with the usual spout 11, and is formed at diametrically opposite points on its rim with upstanding ears 12, 12. The inner faces of the ears 12 preferably are flush with the inner surface of the receptacle, and each ear is formed with an aperture 13 which is countersunk from the inner face of the ear. The receptacle is provided with a bail 14 which has its ends swivelled in the respective apertures in the ears 12.

The bail 14 is a generally arcuate structure comprising a metal core 14ª and a protective covering 14ᵇ of hard or relatively stiff rubber vulcanized thereupon. The end portions of the metal core 14ª are directed toward each other, substantially perpendicular to the adjacent portions of the core, and are threaded as shown at 15. The rubber covering 14ᵇ of the bail terminates in a relatively large flange 16 on each of the respective threaded, in-turned ends of the metal core 14ª.

Generally cylindrical bushings 17, 17 of hard rubber are mounted within the respective apertures 13 of the receptacle ears 12, each bushing being formed with an end flange 18 which seats within the counterbore of the aperture. The flanged ends of the bushings 17 are substantially flush with or lie a little short of the inner faces of the ears 12, and each bushing is formed with a pair of recesses 19, 19 in its flanged end to accommodate a spanner wrench by which the bushing is turned within the aperture 13 to screw it upon or unscrew it from the bail core, the opposite ends of the bushings 17 being formed with threaded axial bores 20, 20. A resilient washer 21 preferably of soft rubber and substantially of the same diameter as the bushing 20 is mounted between each of the latter and the adjacent flange 16 of the bail 14. The threaded portion 15 of the bail end preferably is treated with a suitable adhesive, as indicated in Fig. 3, before the bushing 17 is threaded thereonto, so as to prevent relative movement of said parts in the finished structure.

The diameter of the bushing 17 is sufficiently less than that of the aperture 13 to permit the bushings to move angularly in the aperture with the minimum friction. The parts preferably are so proportioned that the washer 21 will be tightly embraced in sealing relation between the flange 16 of the bail and the adjacent end of the bushing without drawing the inner face of the bushing-flange 18 tightly against the bottom of the counterbore of the aperture 20. The arrangement is such as to prevent fluid from entering between the bushing and the ear, yet the ears are not so tightly embraced as to prevent free movement of the bail. With the parts in the relative positions described, the washer 21 is permanently under compression so as tightly to seal the space between the bushing 17 and the flange 16 of the bail, with the result that even after frictional wear has loosened the bushing 17 in its journal, the threaded portion 15 of the bail-core 14ª will be protected from corrosive fluid which otherwise might pass the washer 21 and attack the metal bail-end.

The invention provides a strong, insulated, swivel connection between a bail and receptacle, and permits nesting of the receptacles, for storage or shipment, without lateral offsetting of the bail-ears, which would make them more subject to breakage than they are when they lie against the adjacent nested bucket.

The invention may be modified within the scope of the appended claims, and I do not limit my claims wholly to the exact construction described.

I claim:

1. A receptacle formed with oppositely disposed apertures in its wall adjacent its rim, respective bushings rotatably mounted in said apertures, and a bail having its respective end portions mounted in said bushings, the said bushings having surfaces of corrosion-resisting material, and corrosion-resisting material on the bail sealed to that of the bushings.

2. A receptacle formed with oppositely disposed, countersunk apertures in its wall adjacent its rim, complementally shaped flanged bushings journaled in said apertures, and a bail having its respective end portions fixedly secured in said bushings.

3. A receptacle formed with oppositely disposed, countersunk apertures in its wall adjacent its rim, complementally shaped flanged bushings journaled in said apertures, and a bail having its respective end portions fixedly secured in said bushings, the said bushings and the said bail having surfaces of corrosion-resisting material and corrosion-resisting washers embraced between said surfaces.

4. A receptacle formed with oppositely disposed, apertured, upstanding ears on its rim, the inner faces of said ears being substantially flush with the inner surface of the receptacle, respective bushings journaled in the apertures in said ears, the inner ends of said bushings being substantially flush or lying short of the inner faces of the ears, and a bail having its end portions mounted in the respective bushings.

5. A receptacle formed with oppositely disposed, apertured, upstanding ears on its rim, the inner faces of said ears being substantially flush with the inner surface of the receptacle, respective bushings journaled in the apertures in said ears, the inner ends of said bushings being substantially flush or lying short of the inner faces of the ears, and a bail having its end portions mounted in the respective bushings, the said bushings having surfaces of corrosion-resisting material and the bail having surfaces of corrosion-resisting material sealed to those of the bushings.

6. A receptacle formed with oppositely disposed apertures in its wall adjacent its rim, respective internally threaded bushings rotatably mounted in said apertures, and a bail having its respective end portions threaded into said bushings.

7. A receptacle formed with oppositely disposed apertures in its wall adjacent its rim, respective internally threaded bushings mounted in said apertures, and a bail having its respective end portions threaded into said bushings, the said bushings having surfaces of corrosion-resisting material and the bail having surfaces of corrosion-resisting material sealed to those of the bushings.

8. A receptacle having a countersunk aperture in its wall, a complementally shaped bushing in said aperture having an end substantially within the wall with respect to one face of the latter, and a handle having an abutment at the opposite face of the wall and an attaching portion mounted in said bushing.

9. A receptacle having an aperture in its wall, a bushing rotatably mounted in said aperture and having a flanged portion at one face of the wall, a handle having an abutment at the opposite face of the wall and an attaching portion mounted in the bushing, said handle and bushing having surfaces of corrosion-resisting material sealed to each other around said attaching portion of the handle.

ANAN W. THOMPSON.